United States Patent [19]

Geisthoff

[11] 4,075,873
[45] Feb. 28, 1978

[54] FREE-WHEELING OVERLOAD COUPLING

[75] Inventor: Hubert Geisthoff, Lohmar, Germany

[73] Assignee: Jean Walterscheid GmbH, Lohmar, Germany

[21] Appl. No.: 719,321

[22] Filed: Aug. 31, 1976

[30] Foreign Application Priority Data

Sep. 11, 1975  Germany .............................. 2540489

[51] Int. Cl.² ............................................. F16D 43/20
[52] U.S. Cl. ....................................... 64/29; 64/28 R; 192/56 R
[58] Field of Search ................. 64/28, 29 R; 192/56 R

[56]  References Cited
U.S. PATENT DOCUMENTS

| 2,846,859 | 8/1958 | Schroter ................................. 64/29 |
| 3,095,955 | 6/1963 | Orwin ................................. 192/56 R |
| 3,185,275 | 5/1965 | Orwin ................................. 192/56 R |
| 3,722,644 | 3/1973 | Steinhagen ........................... 64/29 |
| 3,738,122 | 6/1973 | Ricks ................................. 64/29 |
| 3,774,738 | 11/1973 | Steinhagen ........................... 64/29 |
| 4,007,818 | 2/1977 | Orwin ................................. 192/56 R |

*Primary Examiner*—Benjamin W. Wyche
*Assistant Examiner*—R. C. Turner
*Attorney, Agent, or Firm*—Edmund M. Jaskiewicz

[57] ABSTRACT

An overload coupling has a first coupling member, a second coupling member which is rotatable relative to the first coupling member but fixed axially with respect thereto and a third coupling member rotatably disposed between the first and second coupling members and axially movable between a first position in which torque transmitting means provided on the second and third coupling members are in engagement and a second position in which the torque transmitting means are disengaged. A plurality of torque transmitting balls are circumferentially spaced in the first coupling member and are spring biased axially toward the second coupling member. The third coupling member is provided with a plurality of arcuate recesses to receive the torque transmitting balls and each of these recesses has a torque transmitting portion and a free-wheeling portion. The axial distance between the torque transmitting and free-wheeling portions is greater than the distance between the engaged and disengaged positions of the third coupling member. The first coupling member is further provided with a plurality of spring biased bolts which are engageable with the third coupling member to urge the third coupling member into its engaged position during movement of the torque transmitting balls from their free-wheeling positions to their torque transmitting positions in the recesses.

2 Claims, 5 Drawing Figures

FREE-WHEELING OVERLOAD COUPLING

The present invention relates to an overload coupling which limits the torque being transmitted, more particularly, to such a coupling having a free-wheeling position during overload conditions.

One form of a torque limiting overload clutch coupling has a number of spring loaded balls freely movable in bores spaced circumferentially around an inner coupling member or hub and extending parallel to the coupling axis. The balls or roller bodies transmit torque to an outer coupling member by engaging in recesses provided in the outer coupling member. The driving torque may be transmitted by a plurality of balls loaded by a plate spring so that the balls engage in tracks formed in an annular disc or plate. Should the torque exceed a predetermined magnitude, the balls will overcome the loading force of their springs and will slide over the highest point of their engagement surface in the ball tracks to slip over the tracks until the transmitted torque is restored below the overload level. Such a coupling structure does not include any provision for free-wheeling or idling of the coupling during overload conditions.

During the continuous running of such a coupling while the torque level is exceeded the balls will remain in constant contact with the other clutch member. The result will be a considerable accumulation of friction heat, excessive wear and a very high noise level. Such a coupling cannot idle or be in a free-wheeling state without generating heat because of the friction of the contacting components thereof.

It is therefore the principal object of the present invention to provide an improved overload coupling which has provision for free-wheeling.

It is another object of the present invention to provide an overload coupling which will automatically disengage when a specified torque level is exceeded but will remain free from any buildup of frictional heat.

It is another object of the present invention to provide such an overload coupling wherein only minor adjustment or resetting forces are necessary in order to restore torque transmission after overload torque conditions have been corrected.

According to one aspect of the present invention an overload or torque limiting coupling may comprise a first coupling member and a second coupling member which is rotatable but fixed axially with respect to the first coupling member. A third coupling member is rotatably disposed between the first and second coupling members and has opposed faces thereof directed toward the first and second coupling members. Interengageable torque transmitting means are provided on the second and third coupling members. The third coupling member is axially displaceable between a torque transmitting position and a disengaged position with respect to the first and second coupling members. A plurality of torque transmitting roller elements are circumferentially spaced in the first coupling member and the roller elements are resiliently urged toward the third coupling member. One face of the third coupling member is provided with a plurality of arcuate recesses to receive the roller elements and each recess has a torque transmitting portion and a free-wheeling portion. The axial distance between the torque transmitting and free-wheeling portions is greater than the axial distance between the engaged and disengaged positions of the third coupling member so that when said torque transmitting elements are in the free-wheeling portions of their recesses the second and third coupling members are disengaged. Spring biased means urge the third coupling member into its torque transmitting position during movement of the torque transmitting roller elements from the free-wheeling to the torque transmitting portions of the recesses.

When the torque limit is exceeded, the coupling will be automatically switched into a free-wheeling state wherein the interengageable torque transmitting components are no longer in engagement but rotate freely slightly spaced from each other to avoid friction and reduce noise.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
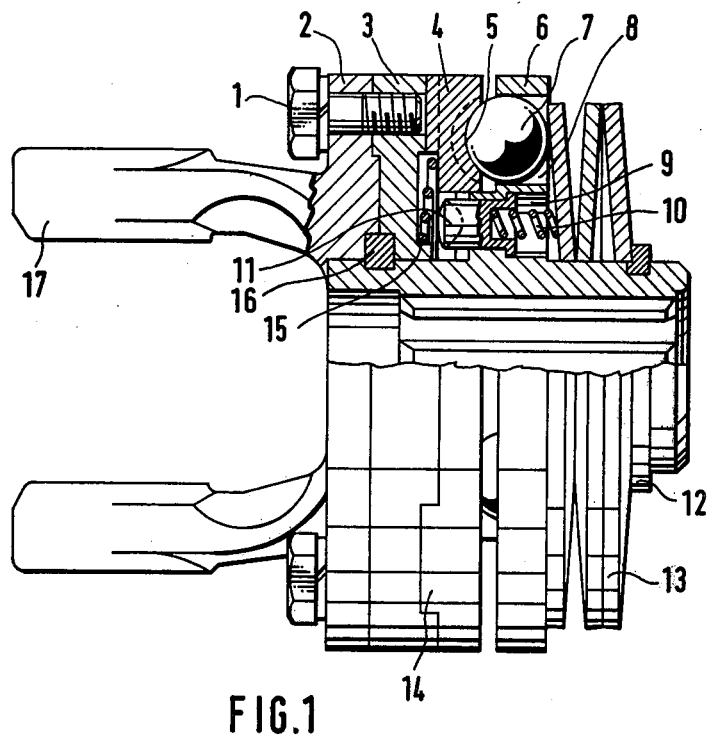
FIG. 1 is an elevational view of the coupling according to the present invention with a portion thereof being shown in section.
Figure 5:
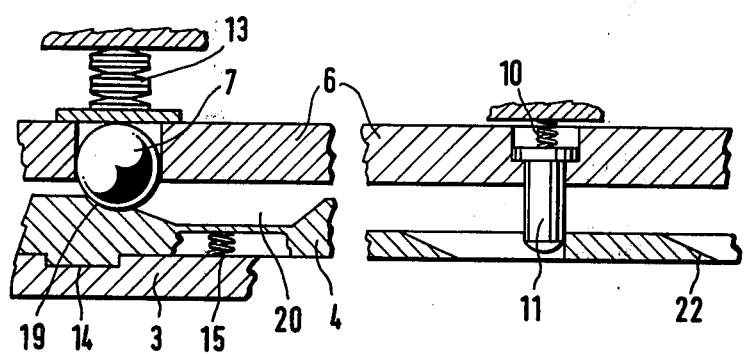
FIG. 5 is a diagrammatic view in section of the relative position of the components of the coupling in one operative position.
Figure 2:
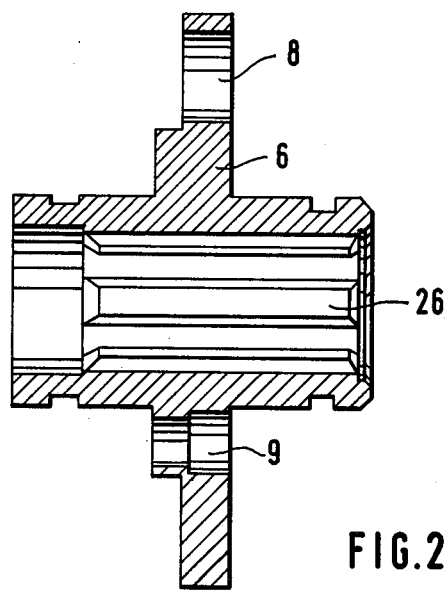
FIG. 2 is a longitudinal sectional view of the coupling hub of the coupling of FIG. 1.
Figure 3:
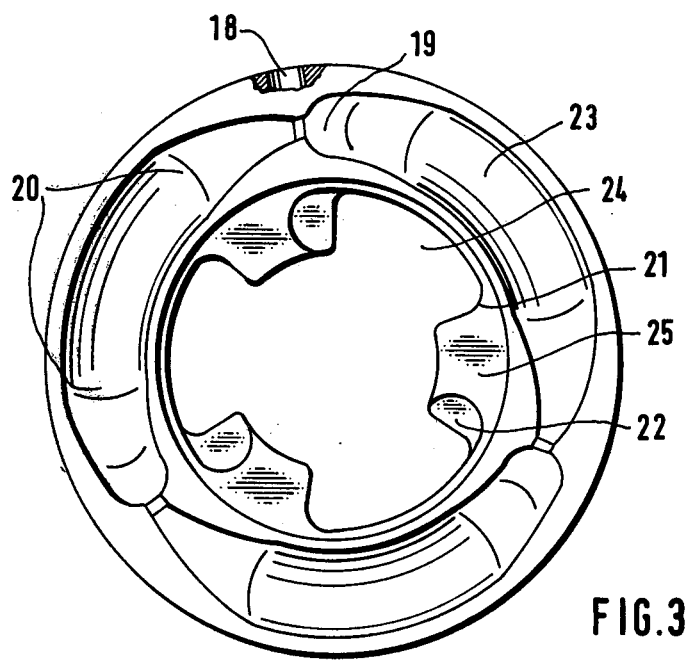
FIG. 3 is a plan view of a face of the annular setting member of the coupling hub.
Figure 4:
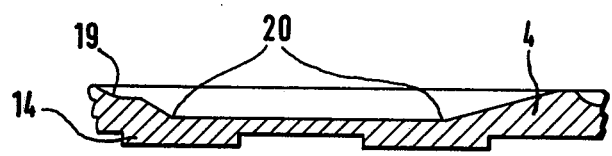
FIG. 4 is a developed view in section of a ball groove of the annular setting member of FIG. 3.

The overload coupling of the present invention as shown in FIG. 1 comprises a coupling hub member 6 which may be designated as a first coupling member and which has a bore therethrough provided with longitudinally extending splines for driving connection to a driven shaft which may be a power take-off shaft of a tractor. Coupling flanges 2 and 3 which are bolted together by bolts 1 constitute a second coupling member and the flange 2 is connected to a yoke arm 17 of a universal joint. The flanges 2 and 3 are provided with torque transmitting engaging configurations and are rotatably mounted upon the hub 6 by means of half rings 16.

The hub 6 has a flange portion in which are a plurality of circumferentially spaced axially extending bores 8 which in this embodiment of the invention are spaced 120° apart. Inwardly of the bores 8 in the flange portion are formed three axially extending bores 9 which are spaced from each other by 120° and which receive bolts or plunger elements 11. Torque transmitting balls 7 are positioned in the bores 8 and are urged axially toward the second coupling member 2,3 by plate springs 13 which are secured by a tension nut 12. The plate springs 13 also act against springs 10 which urge the plunger elements 11 axially toward the second coupling member 2,3.

Positioned between the first coupling member 6 and the second coupling member 2,3 is an annular setting member 4 which may be designated as a third coupling member and which has a circumferential outer surface. The annular member 4 is axially displaceable with respect to the second coupling member 2,3 and is also rotatable with respect to the second coupling member 2,3. The radial face of the annular member 4 directed toward the second coupling member 2,3 is provided with torque transmitting formations or configurations in the form of bosses 14 which mesh with correspondingly shaped openings or recesses in the coupling flange 3.

The other radial face of the coupling member 4 directed toward the coupling hub 6 is provided with a plurality of arcuate ball track grooves or recesses 23 each of which has a free-wheeling portion 20 and a torque transmitting portion 19 which may be in the form of a spherical seat 5. Radially inwardly of the grooves 23 are similarly segment or arcuately shaped recesses 24 each having at one end thereof an inclined guide face 22 and at the other end an operative or setting face 25. The bolts 11 which are supported in the bores 9 of the flange portion of the hub 6 engage in the recesses 24 under the force exerted by the springs 10.

A spring 15 is positioned between the annular member 4 and the flange 3 so as to act against both of these members. The outer circumferential surface of the annular member 4 is provided with a plurality of radially extending bores 18 into which a suitable tool may be inserted for turning this annular member.

When the coupling is in its operative or engaged position as shown in FIG. 1, the plate springs 13 urge the torque transmitting balls 7 into the spherical recesses 5 of a torque transmitting portion 19 of the ball tracks 23. Also, the springs 10 will resiliently urge the bolts 11 against the other end 21 of the arcuate recesses 24 in the annular member 4. As a result of this interaction of the balls 7 and bolts 11, the annular member 4 and the coupling flange 3 are relatively stabilized in the direction of rotation. In this position, the annular member 4 can rotate in the driving direction with respect to the coupling flange 3 only if a predetermined magnitude of torque is exceeded.

In the opposite direction of rotation or drive of the coupling, the flange 3 and the annular member 4 are mutually locked together by the presence of the bolts 11 against the torque transmitting ends 21 of the arcuate recesses 24 in the annular member 4.

The annular member 4 and the coupling flange 3 are in engagement or the torque transmitting position by the inter-engagement of the meshing profiles or surface configurations 14 and in this position the free-wheeling spring 15 for the annular member 4 is compressed.

In one application of the coupling according to the present invention the hub member 6 is non-rotatably fitted on the splined end of a power take-off shaft of a tractor and the yoke 17 is connected through a universal joint with the cardan shaft or drive transmission shaft of an agricultural machine attached to the tractor. When the coupling is engaged, torque is transmitted through the hub member 6, the torque transmitting balls 7 forced by the plate springs 13 into the seats 5, to the annular member 4. The annular member 4 is non-rotatably connected by the meshing structures 14 with the flange 3 and, consequently, torque is transmitted to the yoke arm 17 and thus to the associated shaft of the attached machine.

In the event of operating difficulties or other malfunctions which would overload the cardan shaft so that the torque transmitted to the coupling would exceed a predetermined magnitude of torque, the balls 7 would leave the torque transmitting positions 19 of the recesses 23 and each ball would pass over the highest point at the end of its own recess or groove and would then enter into the next recess to drop into the free-wheeling portion 20 of this next recess. Since the balls 7 no longer maintain the annular member 4 and flange 3 in engagement with each other the spring 15 will move the annular member 4 axially to be disengaged from the flange 3. This axial movement is possible because the bolts 11 are in alignment with the recesses 24 and in this position will not oppose the movement of the annular member 4. When the inter-engaging torque transmitting structures 14 on the annular member 4 and the flange 3 are disengaged, the coupling will be in its free-wheeling position or state and torque can no longer be transmitted. Accordingly, the cardan shaft and the machine will be protected from damage.

Because the members 3 and 4 are completely disengaged from each other in the free-wheeling position, no noise will be generated and there will be no wear and tear resulting from friction as would be the case in previously known and conventional couplings.

When it is desired to restore the coupling to the torque transmitting state, the driving torque to the hub 6 is shut down so that no torque whatsoever is applied to the coupling. A suitable tool or object such as a bolt or rod is inserted into one of the bores 18 in the annular coupling member 4. The member 4 is then turned back in the reverse direction until the balls 7 are again seated in the torque transmitting positions 19 of the recesses 23. At the same time, the bolts 11 will slide along the inclined surfaces 22 to abut the radial faces 25 between the recesses 24. Since the force exerted by the spring 15 is less than the force exerted by the combined springs 10 acting against the bolts 11, the annular member 4 will be resiliently urged toward the flange 3. The members 3 and 4 will engage when the formations 14 on the opposing surfaces of these members mesh and become interengaged. At the end of this resetting operation, the balls 7 will be seated in the torque transmitting positions 19 of their recesses and the bolts 11 under the force of their springs 10 and the plate springs 13 once again will be received into the recesses 24 and will abut against the stop or end faces 21 of these recesses to establish the original torque transmitting condition.

The coupling device as described above may also be provided with a magnetically or mechanically controlled braking device in order to reset the coupling to transmit torque while maintaining the drive connection. With such a modification it is thus not necessary to shut down the drive to the coupling hub as described above.

With such a braking device, the flange 3 will move angularly with respect to the third coupling member 4 during which movement the bolts 11 will slide along the guide faces 22 toward the operative faces 25. Since the bolt springs 10 exert a greater force than the free-wheeling spring 15 the bolts 11 will move the annular member 4 axially into engagement with the coupling flange 3 until the torque transmitting configurations 14 are fully engaged. At the same time, the torque transmitting balls 7 will have reached the torque transmitting portions 19 of the recesses 23 and will be forced into the ball seats 5 under the force exerted by the plate springs 13. When this torque resetting operation has been completed, the bolts 11 will again abut the ends 21 of their recesses 24 to maintain the torque transmitting condition. At this stage, the coupling is now fully operational again and transmits torque.

In a further modification, the third coupling member 4 may be provided with a larger diameter than the first and second coupling members 2,3 and 6 in order to facilitate the application of a force to reset the coupling to the torque transmitting state.

It is apparent that when the torque transmitting balls 7 are in their operative or torque transmitting positions, the slide bolts 11 will engage at the opposite ends of the arcuate recesses 24 in the clutch member 4 and thus contribute to provide a stable operative torque transmitting position for the balls 7.

The free-wheeling spring 15 which is positioned between the annular coupling member 4 and the coupling flange 3 applies a loading force which is less than that applied to the bolts 11 by the combined bolt springs 10. As a result of this relationship, only a relatively small force is required to reset the coupling to the torque transmitting state because the bolts 11 which slide upwardly along the inclined faces 22 can easily overcome the imposing force of the spring 15 because of the greater strength of the load springs 10. The inter-engaging torque transmitting configurations 14 will readily engage each other while the balls 7 slide easily into their torque transmitting positions 19 at the same time.

Thus it can be seen that the present invention has disclosed an overload coupling having a free-wheeling state when a predetermined torque is exceeded. The high friction wear, loud noises and excessive heat generated in previously known couplings are not present in the coupling of the present invention. In the torque transmitting position of the coupling, the balls engage in spherical recesses or seats which produces less friction than usual for the conventional sloping engagement faces. The balls must overcome a much steeper gradient on being disengaged from their recesses while during operation of the coupling the balls are positioned with a much firmer seat within the recesses than on a sloping engagement face.

It will be understood that this invention is susceptible to modification in order to adapt it to different usages and conditions, and accordingly, it is desired to comprehend such modifications within this invention as may fall within the scope of appended claims.

What is claimed is:

1. An overload coupling comprising a first coupling member, a second rotatable coupling member fixed axially with respect to said first coupling member, a third coupling member rotatably disposed between said first and second coupling members, inter-engageable torque transmitting means on said second and third coupling members, said third coupling member being axially displaceable between a torque transmitting position and a disengaged position with respect to said second coupling member, a plurality of torque transmitting roller elements circumferentially spaced in said first coupling member and means for resiliently urging said roller elements toward said third coupling member, a radial face of said third coupling member having a plurality of arcuate recesses therein receiving said roller elements and each recess having a torque transmitting portion and a free-wheeling portion, the axial distance between said torque transmitting and free-wheeling portions being greater than the axial distance between the engaged and disengaged positions of said third coupling member such that when said torque transmitting roller elements are in the free-wheeling portions of said recesses said second and third coupling members are disengaged, and spring biased means engageable with said third coupling member for urging said third coupling member into its torque transmitting position during movement of said torque roller elements from the free-wheeling to the torque transmitting portions in said recesses, said spring biased urging means comprise a plurality of spring-loaded bolts circumferentially spaced on said first coupling member, there being second arcuate recesses on said third coupling member receiving said bolts, each second recess having an inclined guide surface at one end and a torque transmitting portion at its other end.

2. An overload coupling as claimed in claim 1 wherein said bolts prevent relative rotation between said first and third coupling members in the direction from the torque transmitting to the free-wheeling portions when said bolts are in the torque transmitting portions of said second recesses.

* * * * *